(12) United States Patent
Miller et al.

(10) Patent No.: US 7,006,763 B2
(45) Date of Patent: Feb. 28, 2006

(54) METHOD AND APPARATUS FOR INFRARED WELDING OF THERMOPLASTIC PARTS

(75) Inventors: Roger Miller, Holland, MI (US); Andrew Van Klompenberg, Grandville, MI (US)

(73) Assignee: Extol, Inc., Leeland, MI (US)

( * ) Notice: Subject to any disclaimer, the term of this patent is extended or adjusted under 35 U.S.C. 154(b) by 0 days.

(21) Appl. No.: 10/418,422

(22) Filed: Apr. 18, 2003

(65) Prior Publication Data
US 2003/0194226 A1 Oct. 16, 2003

Related U.S. Application Data

(63) Continuation-in-part of application No. 09/940,167, filed on Aug. 27, 2001, now abandoned.

(51) Int. Cl.
*H05B 3/00* (2006.01)
*B29C 65/00* (2006.01)

(52) U.S. Cl. ............... 392/420; 392/411; 392/421; 156/272.2; 156/304.1; 156/499; 219/243

(58) Field of Classification Search ........ 392/419–429, 392/411, 416, 418, 407, 408; 156/272.2, 156/273.3, 304.1, 304.2, 499; 219/243, 85.12, 219/85.13
See application file for complete search history.

(56) References Cited

U.S. PATENT DOCUMENTS

| | | | | |
|---|---|---|---|---|
| 2,129,676 A | * | 9/1938 | Creehan ............... | 362/302 |
| 2,355,459 A | * | 8/1944 | Miskella ............... | 34/105 |
| 2,364,730 A | | 12/1944 | Leskin | |
| 3,384,526 A | * | 5/1968 | Abramson et al. ..... | 156/499 |
| 3,399,291 A | * | 8/1968 | Limbach .............. | 219/243 |
| 3,621,198 A | | 11/1971 | Herbrich | |
| 3,649,811 A | | 3/1972 | Schoenthaler | |
| 3,804,691 A | * | 4/1974 | Trivedi ............... | 219/243 |
| 3,864,547 A | | 2/1975 | Ray | |
| 3,949,231 A | * | 4/1976 | Blunck et al. ......... | 250/493.1 |
| 4,025,378 A | * | 5/1977 | Amsden et al. ........ | 156/275.1 |
| 4,233,493 A | | 11/1980 | Nath | |
| 4,350,915 A | * | 9/1982 | Wyatt et al. .......... | 310/306 |
| 5,113,479 A | | 5/1992 | Anderson et al. | |

(Continued)

FOREIGN PATENT DOCUMENTS

FR    1465204    1/1967

(Continued)

OTHER PUBLICATIONS

W.T. Welford & R. Winston, "Nonimaging Concentrators: The Compound Parabolic Concentrator",High Collection Nonimaging Optics,1989, Chapter 4: p. 53-76, Academic Press, Inc., San Diego.

Primary Examiner—John A. Jeffery
(74) Attorney, Agent, or Firm—Young & Basile, P.C.

(57) ABSTRACT

An infrared welder for thermoplastic materials comprising the combination of a halogen lamp producing illumination in the infrared band located at the focal point of a first parabolic reflector. The parabolic reflector is joined in a substantially continuous fashion with a non-imaging lower reflector such as a Winston cone or a "CPC" having a lower aperture through which essentially all of the radiation from the source is directed. The aperture defines the shape and size of the weld area. The lower reflector may be brought into contact with the thermoplastic materials during the welding operation. Alternatively, a selectively operable press device may be used. Several embodiments are disclosed including embodiments which produce circular spot welds, linear welds, curved welds and corner welds.

25 Claims, 8 Drawing Sheets

U.S. PATENT DOCUMENTS

| | | | |
|---|---|---|---|
| 5,149,943 A * | 9/1992 | Kupcikevicius et al. | 219/243 |
| 5,228,109 A | 7/1993 | Fujii et al. | |
| 5,677,983 A | 10/1997 | Oparin et al. | |
| 5,740,314 A | 4/1998 | Grimm | |
| 5,840,147 A | 11/1998 | Grimm | |
| 6,054,072 A | 4/2000 | Bentley et al. | |
| 6,099,291 A | 8/2000 | Lanser | |
| 6,296,470 B1 | 10/2001 | Lanser et al. | |
| 6,387,209 B1 | 5/2002 | Nettesheim | |
| 6,426,486 B1 | 7/2002 | Bartok | |

FOREIGN PATENT DOCUMENTS

| | | | |
|---|---|---|---|
| GB | 1565654 | | 4/1980 |
| JP | 55-103920 | | 8/1980 |
| JP | 58-26482 | * | 2/1983 |
| JP | 59-49182 | * | 3/1984 |
| JP | 5-34068 | * | 2/1993 |
| JP | 7-110130 | * | 4/1995 |
| JP | 8-216261 | * | 8/1996 |
| JP | 10-82589 | * | 3/1998 |
| JP | 10-166451 | | 6/1998 |
| WO | WO 98/16344 | | 4/1998 |

* cited by examiner

METHOD AND APPARATUS FOR INFRARED WELDING OF THERMOPLASTIC PARTS

CROSS-REFERENCE TO RELATED APPLICATION

This application is a continuation-in-part of U.S. application Ser. No. 09/940,167, filed Aug. 27, 2001 now abandoned, entitled "INFRARED WELDER" and claims priority thereto for common subject matter.

FIELD OF THE INVENTION

This invention relates to the joining of thermoplastic parts through the application of infrared energy to one or all of the parts to be joined and wherein the source of the infrared energy is an incandescent lamp whose output rays are directed toward a defined target area by means of one or more reflectors.

BACKGROUND OF THE INVENTION

It is well known that thermoplastic parts can be joined by heat welding. A common application of this knowledge is found in the construction of automobile interior panels and components such as sun visors which are constructed largely of thermoplastic components. Heat welding can be achieved by any of several technologies or methods including hot plate welding, hot air jet welding, laser welding and ultrasonic welding.

Hot plate welding, generally speaking, involves the application of a heated metal plate to the thermoplastic parts to be joined. A significant disadvantage in hot plate welding is the fact that thermoplastic material often sticks to the hot plate, resulting in filaments or streamers of material being drawn from the thermoplastic parts. This requires secondary cleanup operations to both the parts and the hot plate welder. Hot plate welding is also difficult or impossible to apply to small areas.

Hot air heating for thermoplastic fusion suffers the disadvantage of imprecise application; i.e., the hot air flows not only over the target area but also over surrounding areas and components which are undesirable to heat.

Laser heating suffers a number of disadvantages including high expense and the dangers which are inherently associated with stray laser radiation.

Ultrasonic welding is technically complex and requires not only an electroacoustic transducer but also a properly dimensioned horn which can be resonated.

SUMMARY OF THE INVENTION

One aspect of the present invention is a method of welding or joining two or more thermoplastic parts by first heating a well-defined area of one or more of the parts through the application of infrared energy generated from an incandescent source and directed toward the area by one or more reflectors. In the simplest form, the method involves the steps of locating the incandescent source at the focal point of a parabolic reflector thereby to produce a collimated output which is directed toward a target area to soften the thermoplastic material throughout the target area to produce contemporaneous or subsequent fusion.

In a more typical application, the method involves placing an incandescent, infrared source at or near the focal point of an imaging reflector which, at least in one cross-sectional plane, is parabolic so as to direct rays from the source in a substantially collimated pattern, collecting the rays in or by a second reflector which is joined to and substantially contiguous with the first reflector but which is of a non-imaging character, so as to direct substantially all of the output rays through an aperture formed in the second reflector, the size and shape of which substantially conforms to the size and shape of the target area in the thermoplastic material or materials to be welded. The first and second reflectors are preferably but not necessarily made of a metal such as aluminum and is are plated with a material sixth as geld gold which is highly reflective to infrared energy so as to reflect substantially all of the infrared energy from the source to and through the aperture to the target area. In the preferred method, the area of metal in the body forming the second reflector and surrounding the aperture is flat such that it may be pressed against the thermoplastic material forming the target area to add joining or welding pressure and to cool the area or volume of thermoplastic material immediately surrounding the target area which conforms to the shape and size of the output aperture in the secondary reflector. In one embodiment hereinafter disclosed, the flat area has two non-coplanar portions to fit into an inside corner.

In accordance with the inventive methodology, the shape and size of the output aperture may take any of several forms from simple circular spots to straight lines, curved lines and angled corners.

According to a second aspect of the invention, an apparatus is provided for generating and directing infrared energy from a source such as an incandescent halogen lamp or series of such lamps to a target area. In the simplest form, the apparatus of the present invention comprises a broadband source such as a halogen lamp and parabolic reflector which receives illumination from the source and directs it toward a defined target area in a collimated fashion.

In a more typical application, the apparatus of the present invention comprises a first reflector of an imaging type; e.g., a parabolic reflector with an infrared source mounted at the focal point to produce a collimated output. The apparatus further comprises a second reflector which is joined to the first reflector in such a fashion as to form one or more essentially contiguous surfaces. The second reflector, unlike the first reflector, is a non-imaging reflector such as a Winston cone which has no focal point and simply directs received energy through an output aperture at the converging end wherein the size and shape of the aperture at least approximates the size and shape of the target area toward which the infrared radiation is directed. In a preferred form, the second reflector is formed of metal such as aluminum and is constructed to have a pressing surface area immediately surrounding the output aperture which surface area can be brought into physical engagement with the thermoplastic material of at least one part to be welded. The pressing surface area can be planar or curved or lie in several planes to fit the welded part or parts. Alternatively, the second reflector may be maintained in closely spaced relationship with the thermoplastic part or parts to be welded.

As it is hereinafter described in greater detail, the first and second reflectors may be configured as surfaces of revolution wherein the overall apparatus takes on an essentially elongated cylindrical shape. Alternatively, the first and second reflectors may be configured in such a way as to produce a line of illumination, either straight, angled, or curved. In other forms, the reflectors are configured to produce a "corner" of illumination such that the weld head formed by the second reflector may be inserted into an inside corner and welding illumination is directed to both of the converging surfaces of the inside corner. In all cases described immediately above, the reflector combination comprises a first imaging reflector which is parabolic in at least one cross section and a second non-imaging reflector such as the Winston cone or compound parabolic concentrator (CPC) which is fully described in the literature.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE ILLUSTRATIVE EMBODIMENTS

Figure 1:
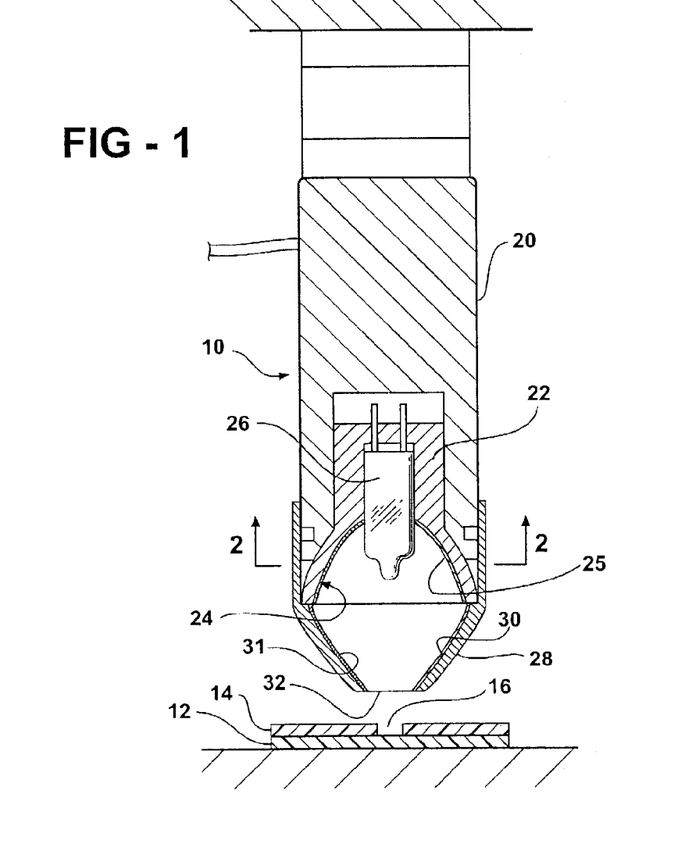
FIG. 1 is a cross-sectional view of a first device embodying the invention.
Figure 2:
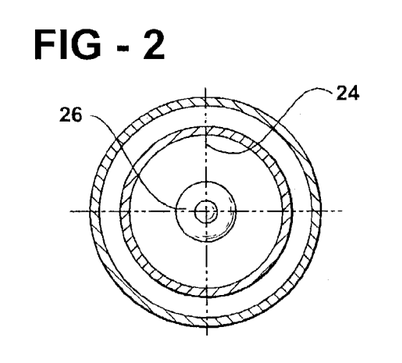
FIG. 2 is a plan view in cross section of cylindrical components in the device of FIG. 1.
Figure 3:
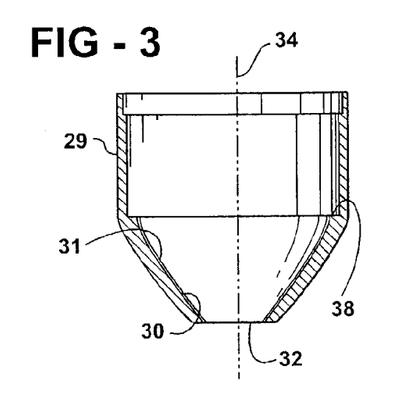
FIG. 3 is a cross-sectional view of a detail in the device of FIG. 1.

Referring now to FIGS. 1–3, a first embodiment of the invention is shown to comprise a generally cylindrical infrared spot welder 10 poised a small distance above layered thermoplastic materials 12 and 14, the upper layer 14 having a small hole 16 punched or otherwise formed therein to admit infrared rays from the welder 10 to the lower layer 12 so that the two layers can be effectively fused together in an area approximating the size and shape of an aperture 32 in the lower end of the welder 10. Hole 16 is not required in cell materials, especially those which are thin and transparent, or nearly so, to infrared radiation.

As shown in the figures, the welder comprises a cylindrical body 20 with passages (not shown) to carry conductors from an outside 110-volt AC source to a broadband source of illumination in the form of a 100-watt halogen lamp or source 26 the output of which contains a substantial percentage of illumination in the infrared range. In actual practice, the lamp of choice is a 12V, 100-watt lamp which requires conversion of the 110V AC to 12 V DC. Various power sources can be used depending on the number and type of lamps required. The lamp 26 is mounted in a holder assembly 22 which fits telescopically into the body 20 of the welder 10 and has formed at its lower end a parabolic surface, or primary reflector, 24 having a deposited layer 25 of gold thereon to preferentially reflect infrared rays from the lamp 26. The lamp 26 is mounted in the holder 22 in such a way that the source of illumination is essentially at the focal point of the parabolic surface 24 whereby the rays of illumination which are emitted from the lamp 26 and reflected off of the gold surface 25 of the parabolic reflector 24 are collimated and travel downwardly along the longitudinal or vertical axis of symmetry of the welder 10 as shown in FIG. 1, this axis of symmetry also carrying the reference character 34 in FIG. 3.

The parabolic reflector 24 diverges; i.e., flares outwardly toward an open end where it abuts and meets the open or larger end of a second reflector 30 formed by an end cap 28 having a cylindrical collar portion 29 which fits around the cylindrical body 20 of the welder 10 to bring a shoulder 38 into abutment with the lower end surface of the parabolic reflector 24. The inside surface or reflector portion 30 of the end cap 28 has deposited thereon a layer 31 of gold which is preferentially reflective to infrared radiation. The lower end of the reflector 30 converges toward aperture 32 which, in the embodiment in FIGS. 1–3, is circular and at least approximates the size and shape of the area of the layered materials 12 and 14 to be welded or fused together.

Reflector 30 is a non-imaging reflector; i.e., it has no focal point and simply causes the collimated rays of illumination from the primary reflector 24 to be directed through the aperture 32 after one bounce off of the deposited gold layer 31. Accordingly, illumination from the halogen lamp 26 is essentially uniformly spread over the area of the aperture 32 and over the area of the layers of materials 12 and 14 to be welded. As stated above, the secondary reflector 30 is a surface of revolution with a curved shape designed to collect the radiation from the halogen lamp 26 and the collimated radiation from the primary reflector 24 and direct the radiation through the aperture 32. In the preferred form, the shape of the secondary reflector 30 is known as a Winston cone or a compound parabolic concentrator (CPC) and has the effect of maximizing the collection of incoming radiation within a particular field of view. Unlike the reflector 24, the reflector 30 is a non-imaging-like concentrator designed to funnel all illumination directed from the primary reflector 24 in the lamp 26 through the aperture 32.

Figure 4:
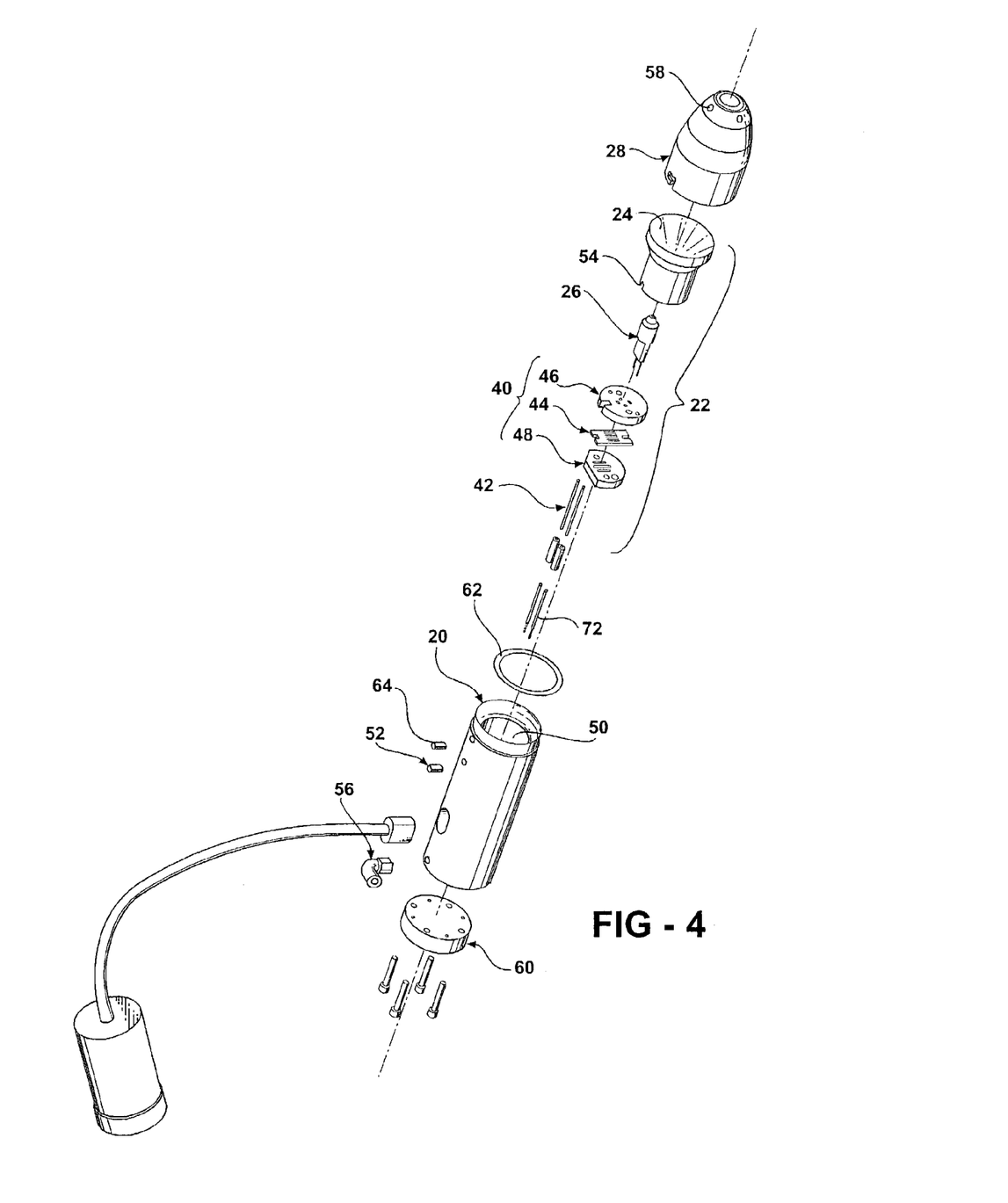
FIG. 4 is an exploded view of the device of FIG. 1.

The welder 10 is shown in an exploded view in FIG. 4. In this view, the welder 10 comprises three subunits, the body 20, the holder 22 and the end cap 28. The holder assembly 22 includes the primary reflector 24, the halogen lamp 26, a lampholder 40 and lampholder electrical connectors 42. In the welder 10, it was found that a part was needed for firmly holding the halogen lamp 26 and for positioning and orienting the amp 26. As such, the lampholder 40 was developed for the welder 10. In addition, the lampholder 40 provides good electrical connection between the leads from the halogen lamp 26 to the electrical connectors 42. The lampholder 40 includes a circuit stamp 44 formed by traces positioned between a first lampholder part 46 and a second lampholder part 48. Parts 46 and 48 are fabricated from high-temperature plastic formed with apertures to admit electrical leads 72 for contacting with the circuit stamp 44. The lampholder 40 is made from three separate pieces but, alternatively, can be formed as a single piece.

Figure 5:
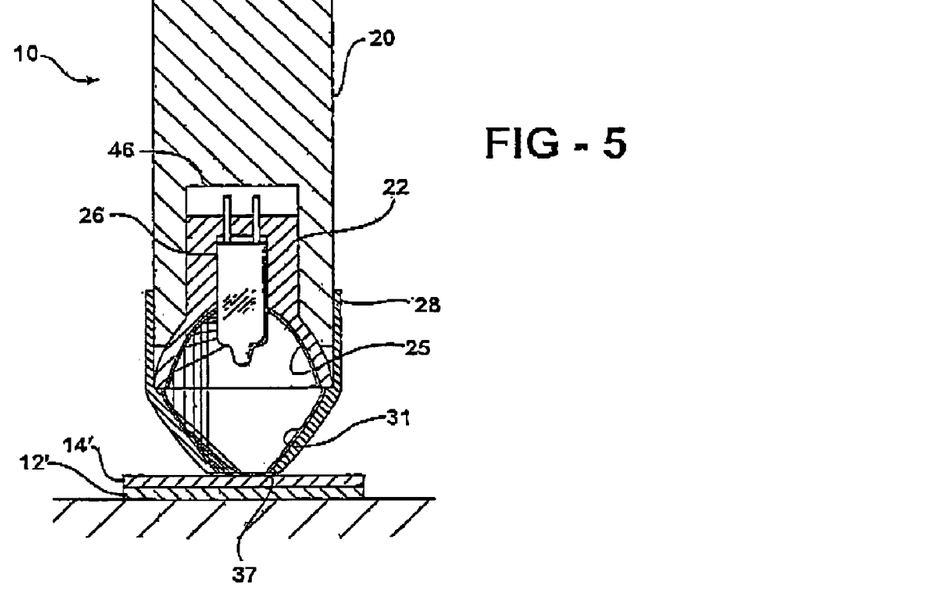
FIG. 5 is a cross-sectional view of a device similar to the device of FIG. 1 but illustrating the manner in which light rays are reflected by the reflectors and further illustrating one manner of using the device.
Figure 6:
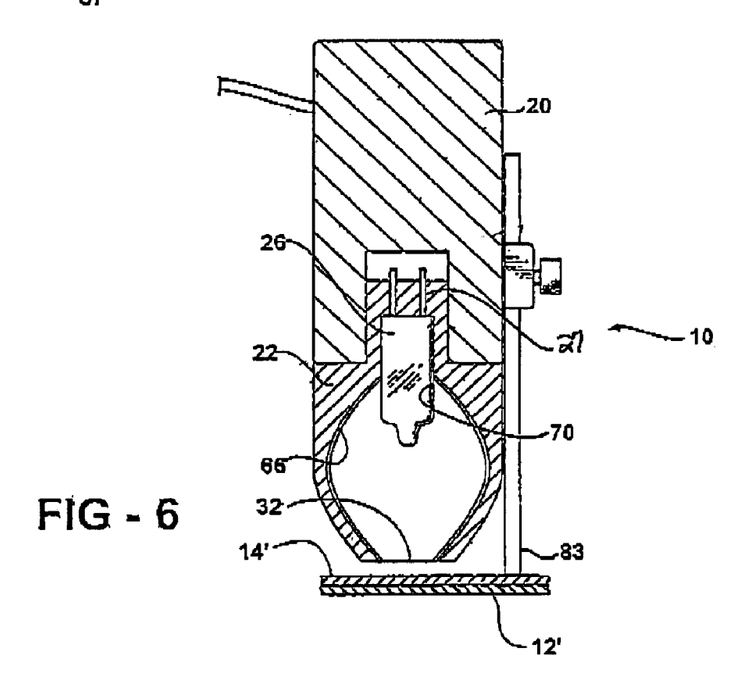
FIG. 6 is a sectional view of a device similar to the structure of FIG. 1 and with a spacer illustrating a second mode of operation.

The leads 27 from the lamp 26 are inserted into the apertures in the lampholder so as to be firmly held. The lampholder 40 is positioned on the end of the holder assembly 22 most distant from the primary reflector 24. The lampholder 40 in the assembly 22 holds the lamp 26 in such a way that the lamp filament 70 is positioned substantially at a focal point of the parabolic primary reflector 24 as shown in FIGS. 5 and 6. Electrical connectors 42 are inserted into the lampholder 40 on the side opposite the lamp 26.

The body 20 as shown in FIG. 4 is generally cylindrical with a hollow bore through the length of the body and having first and second ends. The body includes a cylindrical bore having a receptacle 50 at the first end sized to receive the assembly 22. The body 20 includes a detent pin 52 for meeting with a detent 54 in the assembly 22. The detent pin 52 limits the depth that the reflector assembly 22 is inserted into the body 20 and orients the reflector assembly 22 to a desired position within the body 20. Detent pin 52 is inserted through a hole that extends through the wall of the body 20 to the interior bore.

The body 20 includes an aperture for affixing an air fitting 56 to the body 20 for cooling purposes. The air fitting 56 provides for attachment to an air source. The air provided via the air fitting 56 is used to cool the lamp 26 and to cool the welded plastic following heating by the infrared welder. The air flows through the bore in the body 20, through the air apertures in the lampholder 40 and around the lamp 26. Air enters the chamber encompassed by the primary reflector 24 and the secondary reflector 30 and exits through pores or apertures 58 in the end cap 28 of the secondary reflector. The pores 58 are added to the end cap 28 to permit the exit of the air when the aperture 32 is blocked by the object being welded which occurs whenever the distal end surface; i.e., the surface surrounding the aperture 32, is brought into contact with the material being welded, a strategy which is shown in FIG. 5. The body 20 includes a cover 60 for sealing the second end of the body 20. The cover prevents air from exiting the second end of the body. Optionally, a pneumatic cylinder (not shown) may be attached for the purpose of driving a press used to force plastic pieces together.

The body 20 has a circumferential detent where an O-ring 62 is positioned. The O-ring 2 mates with a complementary detent situated in a collar 29 of the end cap 28. The O-ring 62 provides for a secure fit of the end cap 28 over the end of the body 20 The body 20 includes a pin 64 on the exterior of the body 20 for aligning the end cap 28 and for securely holding the end cap 28 to the body 20.

The welder 10 is assembled by inserting the assembly 22 into the receptacle region 50 of the body 20. The assembly 22 is positioned by aligning the detent 54 with the detent pin 52. The end cap is then fitted over the first cap of the body such that the outer rim of the primary reflector 24 is seated on the shoulder 38 of the secondary reflector 30. The end cap 28 and body 20 fit together such that the O-ring 62 is positioned in a circumferential groove in the body and a complementary detent in the end cap 28. The position of the end cap 28 is oriented by the pin 64 situated in the side of the body 20. The use of the pin 64 permits an end cap 28 having an asymmetrical shape when required by design criteria.

Alternatively, a variation in the design for fitting the end cap 28 on the body 20 may use threads on the exterior of the first end and the end cap 28 may have complementary threading on the interior of the end cap collar 29.

FIG. 5 illustrates a cross-sectional drawing of the welder 10 in an alternative use wherein the planar end surface 37 of the welder; i.e., the surface immediately surrounding the output aperture 32, is brought into contact with the upper layer 14' of layered thermoplastic materials 12' and 14'. As shown in FIG. 5, the rays emanating from the halogen lamp 26 at the largest angle contact the parabolic surface bearing the gold plating 25 and are collimated so as to be directed in essentially axial fashion toward the aperture 32. Those rays which contact the plating 31 of the secondary reflector 30; i.e., the CPC, are directed in one bounce through the aperture 32. In this illustration, substantially like the illustration of FIG. 1, the aperture defines the size and shape of the weld area. In addition, it has been found that the gold plating 25, 31 on the reflective surfaces is so efficient that the metal making up the body of the secondary reflector 30 remains quite cool. When the annular end surface 37 thereof is pressed against the upper layer 14' as shown in FIG. 5, the gold plating 25, 31 serves as a heat sink to ensure that the weld occurs only in the circular area conforming essentially to the size and shape of the aperture 32 in the end cap 28. This is particularly useful where precisely defined weld areas are desired.

FIG. 6 illustrates the welder 10 with an additional accessory in the form of an adjustable spacer 83 which can be used to precisely control the spacing between the output aperture 32 and the top surface of the layered materials 12' and 14'.

Figure 7:
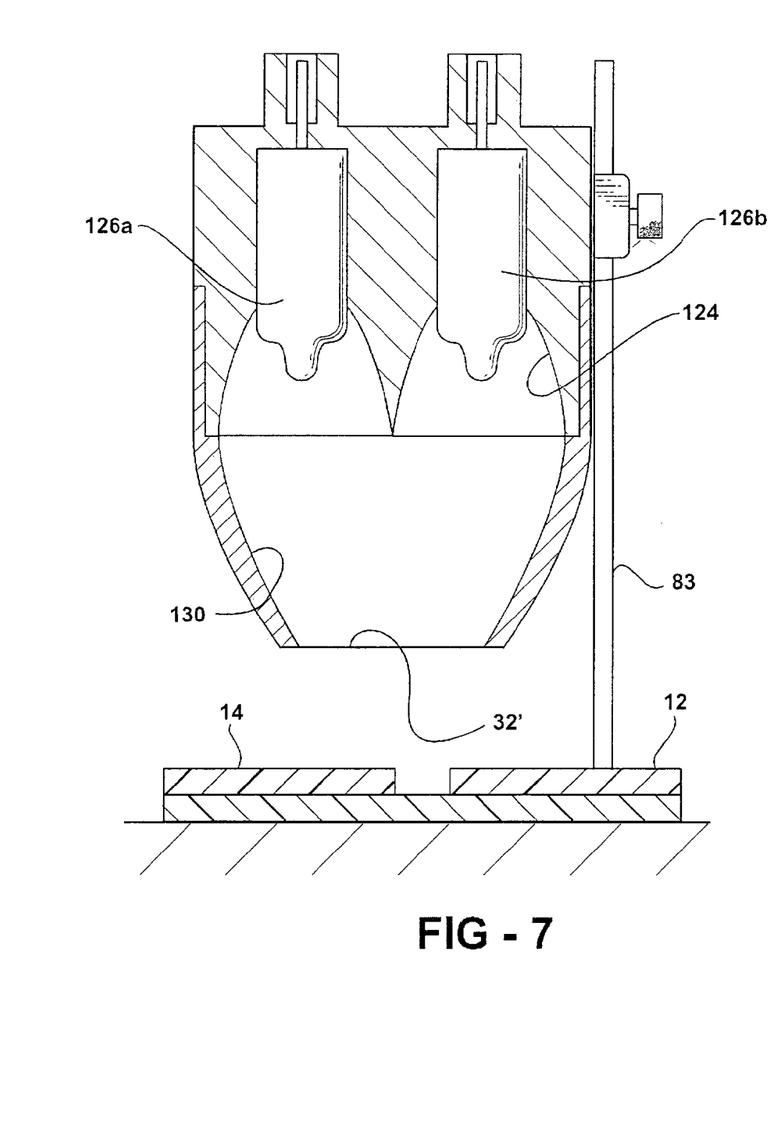
FIG. 7 shows a first alternative construction.

FIG. 7 illustrates another alternative embodiment of the invention comprising two side-by-side halogen lamps 126a and 126b in a holder defining adjacent parabolic reflective surfaces, or primary reflector, 124 which may or may not be coated with gold as previously described. A secondary reflector 130 is mounted to the primary reflector 124 to receive the collimated radiation from both of the sources 126a and 126b and directed outwardly through an aperture 32' which essentially defines the shape and size of the weld area to be formed between the materials 12 and 14. As was the case with respect to the embodiment of FIG. 6, an adjustable spacer 83 is mounted to the device to establish the correct spacing.

Figure 8:
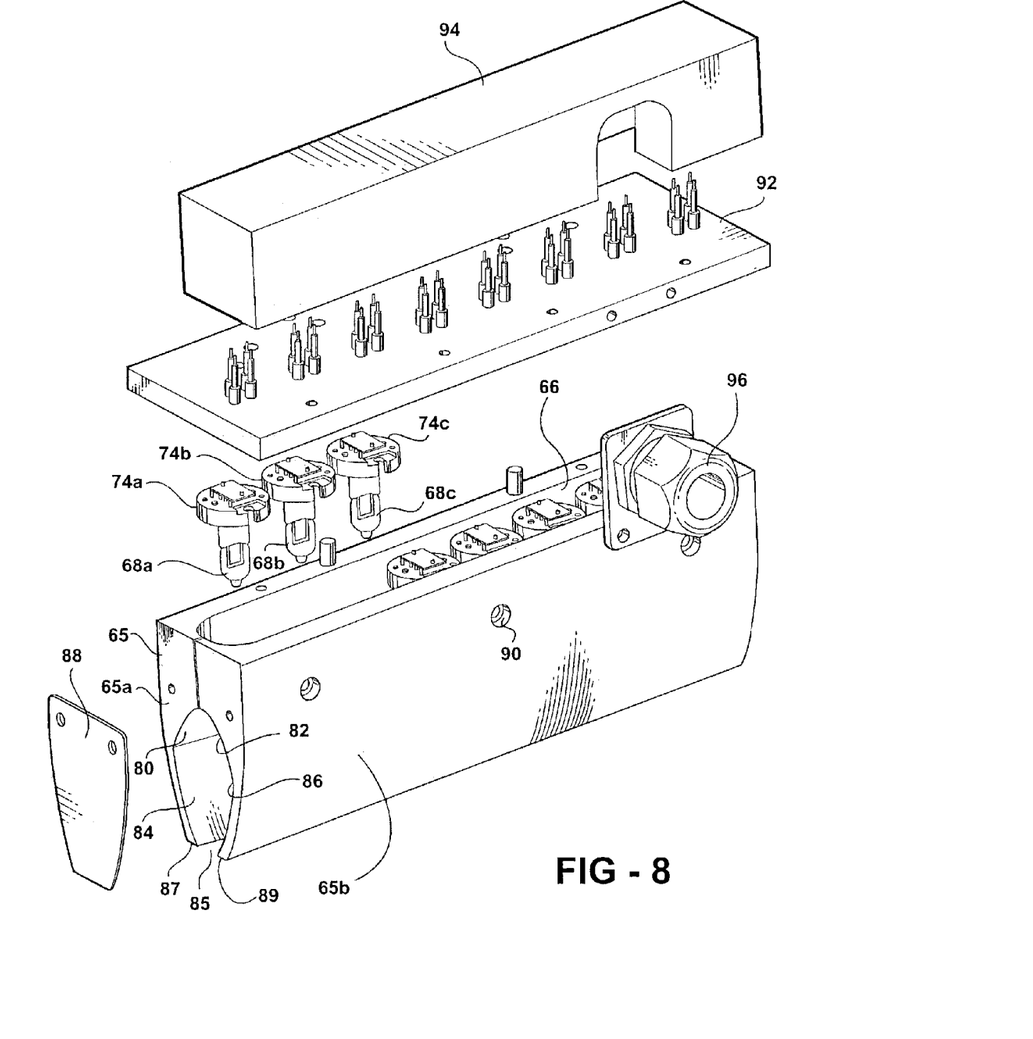
FIG. 8 illustrates a second alternative construction using multiple sources to produce a straight line weld area.

Looking now to FIG. 8, a still further embodiment of the invention is illustrated. The purpose of the device of FIG. 8 is to produce a straight line weld area. Referring to FIG. 8, a reflector assembly 65 is shown to comprise left and right mirror image portions 65a and 65b fabricated such as by machining from aluminum stock. An interior volume 66 is machined out of the assembly to accommodate eight halogen lamps of which only 68a, 68b and 68c are numbered. The lamps have suitable holder assemblies 74a, 74b and 74c corresponding generally to the structure shown at 40 in FIG. 4. The halogen lamps 68a, 68b and 68c, when properly installed, are uniformly spaced along the linear volume 66 with the lamps 68a, 68b and 68c projecting into a reflective interior formed by surfaces 80, 82, 84 and 86. The surfaces 80 and 82 are formed in the upper interior portion of the reflector assembly portions 65a and 65b to form a linearly distributed parabolic reflector; i.e., a reflector which is parabolic in cross-section perpendicular to the linear axis. Once again, the halogen lamps 68a, 68b and 68c are located within the structure of FIG. 8 so as to occupy essentially the focal point of the linearly distributed parabola formed on the surfaces 80 and 82.

The surfaces 80 and 82 are contiguous with the lower surfaces 84 and 86 in the reflector portions 65a and 65b, respectively, to form a non-imaging or Winston cone reflector which operates in the fashion described above. With reference to FIG. 8, a linear aperture 85 defining the shape and size of the weld area is formed between the two opposed legs of the lower reflector assembly where the surfaces 84 and 86 terminate. As is the case with respect to the structures of FIGS. 1–5, surface 80, 82, 84 and 86 are preferably plated with gold so as to reflect substantially all of the infrared wavelength radiation front the lamps 68. A side plate 88 is fastened such as by machine screws to the side surface of the reflector assembly 65. Alternatively the reflector assembly 65 may be joined to another similar reflector assembly to produce an even longer line of infrared weld illumination. End surfaces 87 and 89 axe coplanar straight, parallel lines which can be pressed against the parts to be fused as was described with reference to FIG. 5. A lampholder assembly 92 is provided to make electrical contact between a support structure 94 and the lamps 68. A fastener assembly 96 cooperates with an aperture in the structure 94 to mount the reflector assembly 65 in position.

In using the device of FIG. 8, it is common to press the flat end surfaces of the opposed legs of the lower reflector assembly against the part or parts to be welded. However, a slight spacing may also be used as explained above. The mirror image opposed potions of the reflector assemblies 65a and 65b in FIG. 8 are bald together by means of machine screws placed through suitably formed and threaded apertures 90 in those structures.

Figure 9:
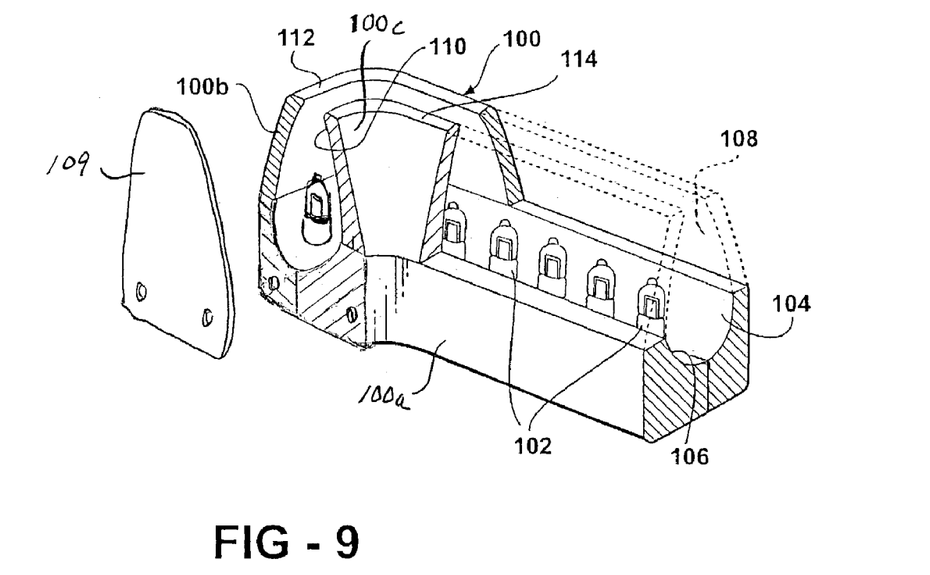
FIG. 9 is a partly broken away view of a device for creating an angled line of weld area.

Referring now to FIG. 9, another embodiment of the invention is shown for producing a curved line of infrared welding illumination. The embodiment of FIG. 9 comprises a reflector assembly 100 having a base 100a, an outside component 100b and an inside component 100c. Parabolic surfaces 104 and 106 are formed in a curved line on the base component 100a to define a primary reflector for halogen lamps 102 located in a distributed fashion along the apex of the parabolic surface. It will be understood that the base component 100a is machined out to provide a location volume for the lamps 102 in a manner similar to that shown in FIG. 8. The base 100a may be made in two parts as shown or as a single piece. The surfaces 104 and 106 are parabolic in a cross-section plane orthogonal to the axis of symmetry which runs along the center line of the curved volume. Again, the lamps 102 are located at the focal line of the parabolic reflector formed by surfaces 104 and 106.

One-half of a CPC surface 108 is formed in the upper outside structural component 100b along with a first anvil or clamping surface 112. The opposite side of the Winston cone or CPC secondary reflector surface 110 is formed in the component 100c along with an interior clamping or anvil surface 114.

In practice, the device of FIG. 9 works the same as the device of FIG. 8, except that the line of welding illumination is curved rather than straight or linear. The lamps 102 are uniformly distributed along the length of the reflector surface and end plates 109 are used to prevent the loss of IR energy through the open ends. The weld line may be extended from the curved portion on one side as shown, or on both sides.

Figure 10:
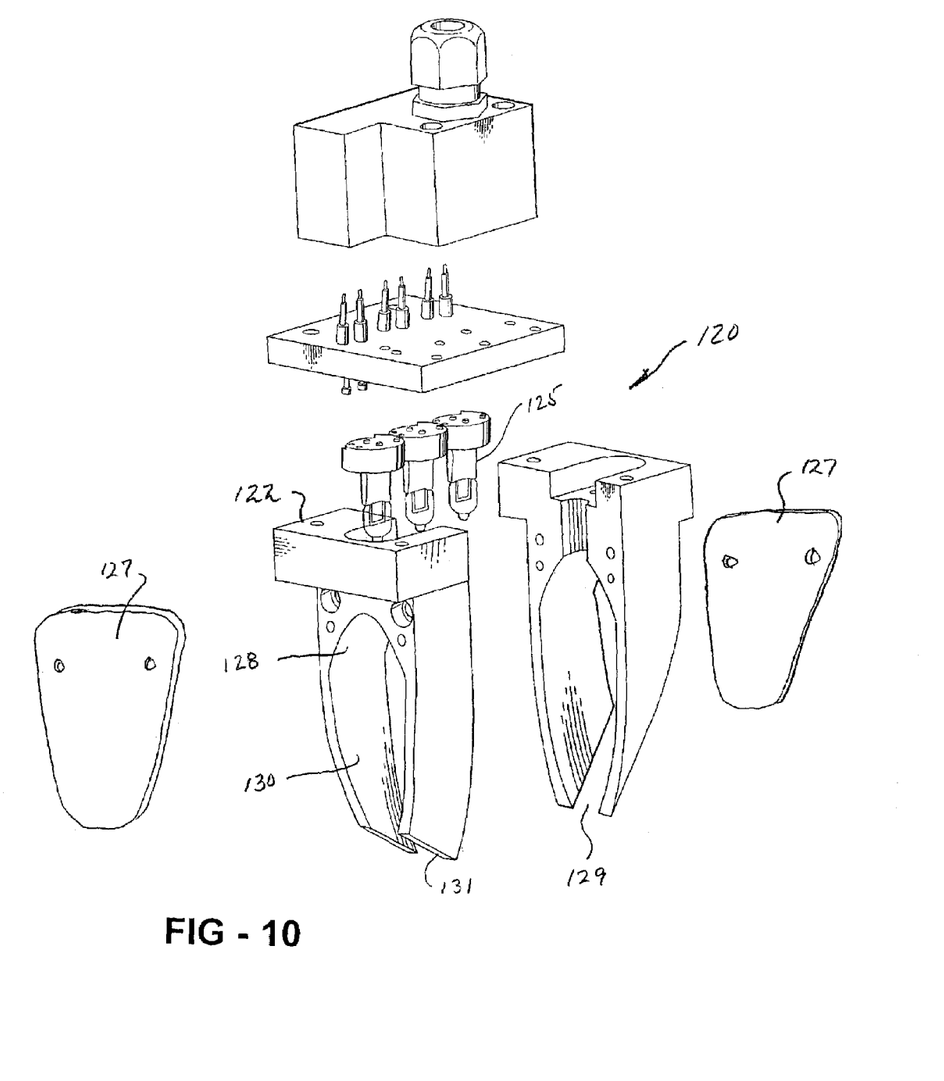
FIGS. 10 and 11 illustrate another alternative construction using multiple sources to create a weld area in an inside corner.
Figure 11:
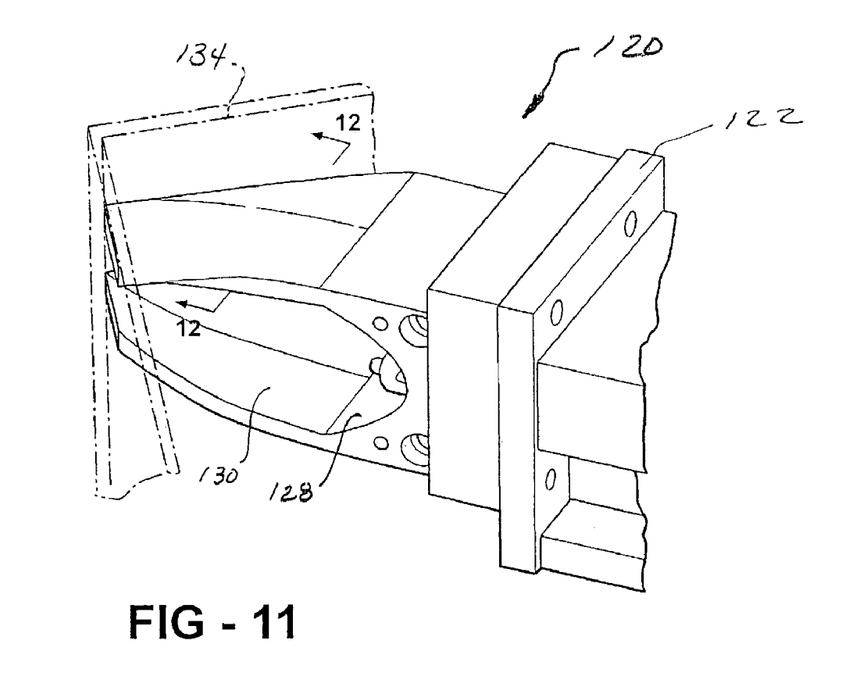
Figure 12:
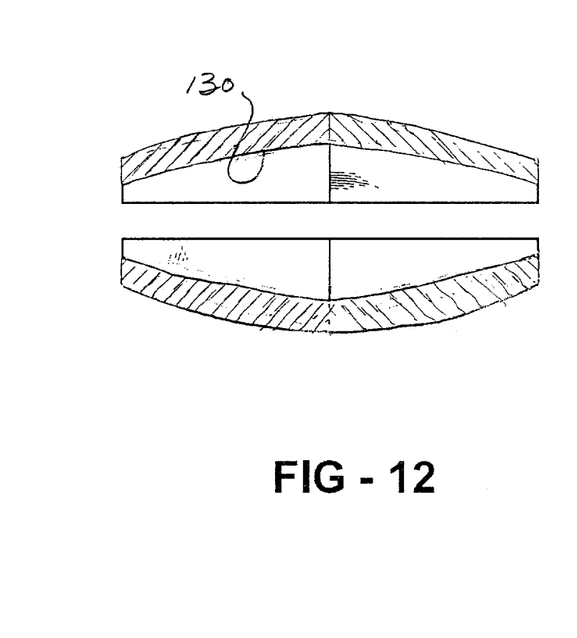
FIG. 12 is a section through the CPC portion of the device of FIG. 11.

Referring now to FIGS. 10–12, another device 120 is shown for projecting a line of welding illumination into an inside corner. The device is again preferably made in several pieces which are machined and screwed together and includes a base 122 for receiving three halogen lamps 125 within a linear volume having a cross-sectional area defined by parabolic reflective surfaces 128. Again, the structure is such that the lamps 125 are located along the distributed focal line of the parabolic reflector. The reflective surface is essentially linear and is contiguous with a secondary CPC surface 130 which is compound as shown in FIG. 12; i.e., it extends outwardly from the junction line with the parabolic reflector to a right-angled end surface 131 of the structure 120 as to fit into and clamp against the inside surfaces of a 90 degree interior corner of a structure 134 to be welded together. The CPC surface 130 varies as shown in FIG. 12 to provide a uniform output intensity along the entire length of the aperture 129 which defines the corner weld. End plates 127 such as shown at 88 in FIG. 8 are used to confine the illumination.

Figure 13:
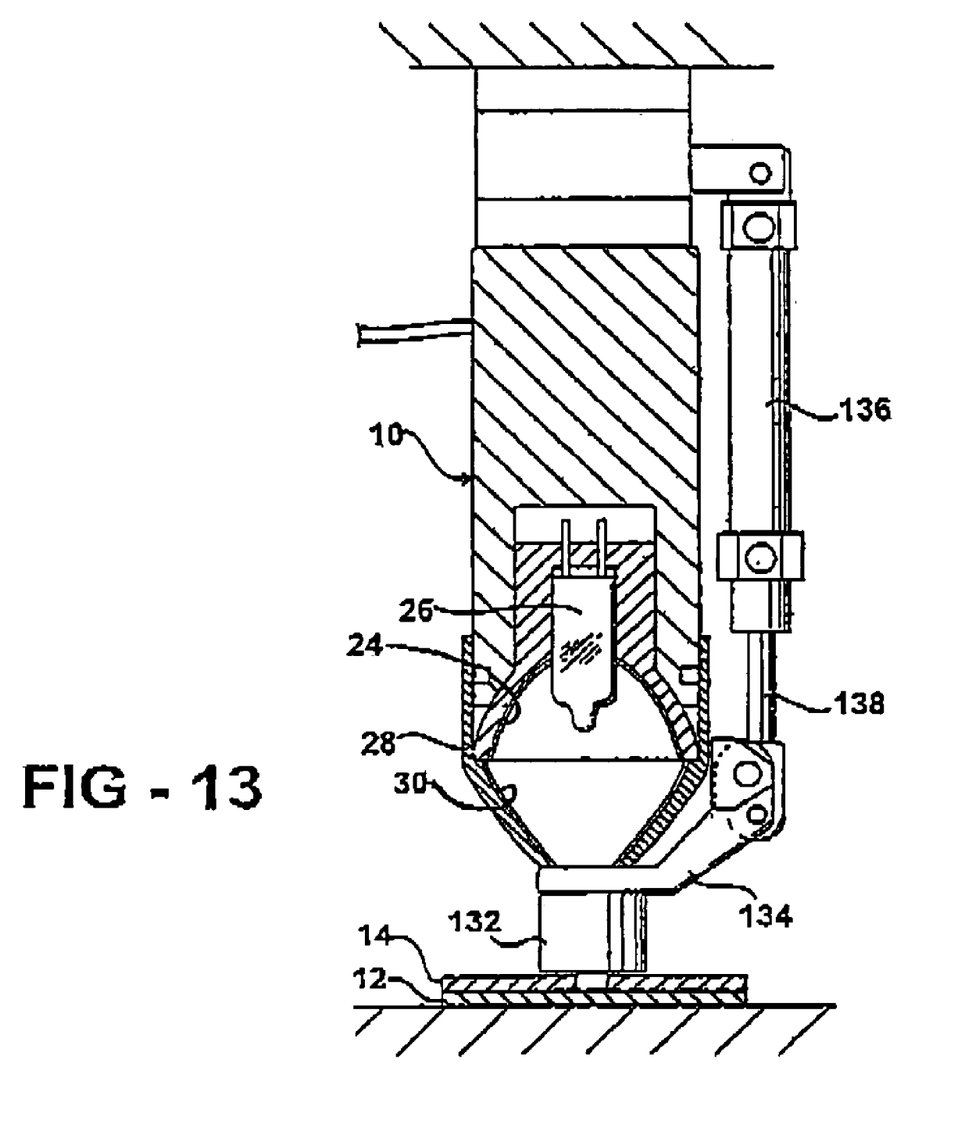
FIG. 13 is a side view of another alternative device including an external punch head.

Referring now to FIG. 13, the device 10 of FIG. 1 is shown combined with an anvil 132 mounted on a swing arm 134 attached to an actuator 136 having an extensible arm 138 for swinging the arm 134 and the anvil 132 between the operative position shown in FIG. 13 and a home position wherein the anvil 132 and the ann 134 are rotated counter-clockwise so as to be out of the way of the device 10 during the heating stage. The typical operation of the device in FIG. 13 is to bring the device 10 very close to or in contact with the layers 12 and 14, whereupon the incandescent lamps 26 are actuated to heat the parts and begin the fusing process. The device 10 may then be raised and the actuator 136 operated to bring the arm 134 and the anvil 132 into the position shown. The device 10 is then further advanced toward the workpiece to perform a pressing operation.

The anvil may also be mounted on a frame which is located within the reflectors 24 and 30 and advanced through the aperture 32 to perform the pressing operation after the healing step. However, the internal location of the frame and anvil within the reflector structure interferes to some degree with the transmission of illumination from the lamp 26 thus favoring the structure shown in FIG. 13 thereover.

It will be appreciated that in all of the embodiments described and shown there is a primary reflector which is parabolic in at least one cross-sectional plane. All such reflectors have a focus and all collimate the rays from the source. In some embodiments, the focus is a point; in others it is a line. In every embodiment, the rays are directed to a well-defined target area.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. Apparatus for joining thermoplastically weldable materials using infrared radiation comprising:
   an energy source for producing radiation in the infrared band; and
   a radiation-directing structure for directing radiation from the source to an area to be welded;
   said structure comprising a parabolic reflector having a reflective interior surface defining a focus;
   said source being located essentially at said focus to produce essentially collimated infrared radiation; and
   a second, non-imaging reflector having an optically continuous reflective interior surface essentially contiguous with the reflective interior surface of the parabolic reflector and defining an outlet having a configuration corresponding to the configuration of the weld area through which radiation is directed toward said area, wherein the essentially collimated infrared radiation is directed to the outlet without significantly reflecting back toward the source.

2. Apparatus as defined in claim 1 wherein the reflective structure includes a parabolic surface of revolution such that the area is circular.

3. Apparatus as defined in claim 1 wherein the source is a halogen lamp.

4. Apparatus for joining thermoplastically weldable materials using infrared radiation to create a weld area comprising:
- an energy source for producing radiation in the infrared band; and
- a radiation-directing structure for directing radiation from the source to an area to be welded; said structure including,
    - (a) a first reflector which at least in one cross-sectional plane is parabolic and has a focus; and
    - (b) a second reflector joined substantially end to end and optically continuous with the first reflector and having, at least in said cross-sectional plane, a non-imaging shape and an outlet at an end remote from the first reflector and of a configuration which substantially corresponds to the desired configuration of the weld area;
- said source being essentially located at said focus whereby radiation from the source is collimated by the first reflector and wherein the radiation from the source collimated by the first reflector is directed to the outlet without significantly reflecting back toward the source.

5. Apparatus as defined in claim 4 wherein said first and second reflectors are surfaces of revolution such that the area is circular.

6. Apparatus as defined in claim 4 wherein the first and second reflectors and said outlet are linear such that the area is linear.

7. Apparatus as defined in claim 6 wherein the source comprises a plurality of spaced apart lamps.

8. Apparatus as defined in claim 4 wherein the first and second reflectors are shaped to produce an area of radiation which at least approximates a straight line.

9. Apparatus as defined in claim 4 wherein the first and second reflectors are shaped to produce an area which at least approximates a curved line.

10. Apparatus as defined in claim 9 wherein the source comprises multiple spaced apart lamps.

11. Apparatus as defined in claim 4 wherein the first and second reflectors are plated with gold.

12. Apparatus as defined in claim 4 wherein the source comprises at least one halogen lamp.

13. Apparatus as defined in claim 4 further including selectively actuated means for pressing the material.

14. Apparatus as defined in claim 4 wherein the second reflector defines a contact surface around the aperture which may be brought into engagement with the material surrounding said area.

15. Apparatus as defined in claim 14 wherein the contact area is circular.

16. Apparatus as defined in claim 14 wherein the contact area comprises two parallel lines.

17. Apparatus as defined in claim 14 wherein the contact area comprises two curved, parallel lines.

18. Apparatus as defined in claim 14 wherein the area comprises non-coplanar portions which intersect to define a corner.

19. Apparatus as defined in claim 14 wherein the second reflector is made in several pieces.

20. A method of thermally joining thermoplastically weldable materials in an abutting or layered relationship comprising the steps of:
- providing a source of infrared radiation;
- collimating the radiation from the source using a first reflector the reflective interior portions of which are parabolic in at least one cross-sectional plane; and
- directing the radiation toward the layered thermoplastically weldable materials to be welded using a second reflector the reflective interior surface or surfaces of which are optically continuous and essentially contiguous with the reflective interior portions of the first reflector wherein the radiation reflected by the first reflector is directed to the outlet in the directing step without significantly reflecting back toward the source.

21. The method of claim 20 wherein the second reflector is non-imaging.

22. The method of claim 21 including the further step of engaging the second reflector with a surface of at least one of the materials.

23. The method of claim 21 further including the step of pressing the materials after being heated.

24. The method of claim 20 wherein the step of directing is carried out by a Winston cone.

25. A method of joining overlying materials by means of a weld joint of defined shape between the materials comprising the steps of:
- layering two materials;
- providing a source of infrared radiation;
- collimating the radiation from the source using a first reflector the reflective interior surface or surfaces of which are parabolic in at least one cross-sectional plane; and
- directing the collimated radiation toward the desired weld joint of the overlying materials using a second reflector the reflective interior surface or surfaces of which are optically continuous and essentially contiguous with the reflective interior surface or surfaces of the first parabolic reflector and which further defines an outlet corresponding to the defined shape through which the radiation is directed toward the weld area wherein the collimated radiation is directed to the outlet in the directing step without significantly reflecting back toward the source.

* * * * *